(12) United States Patent
Ober et al.

(10) Patent No.: US 9,464,160 B2
(45) Date of Patent: Oct. 11, 2016

(54) FLUORINATED ETHOXYLATED POLYURETHANES

(75) Inventors: Michael Henry Ober, Newark, DE (US); Kathleen L. Kanetsky, New Castle, DE (US); Allison Mary Yake, Landenberg, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 724 days.

(21) Appl. No.: 12/869,897

(22) Filed: Aug. 27, 2010

(65) Prior Publication Data

US 2012/0053252 A1 Mar. 1, 2012

(51) Int. Cl.
| | |
|---|---|
| C07D 345/00 | (2006.01) |
| C08G 18/79 | (2006.01) |
| C08G 18/28 | (2006.01) |
| C08G 18/73 | (2006.01) |
| C08G 18/75 | (2006.01) |
| C08G 18/78 | (2006.01) |
| C09K 8/035 | (2006.01) |
| C09K 8/52 | (2006.01) |
| C09K 8/60 | (2006.01) |
| C09K 8/68 | (2006.01) |
| C11D 3/37 | (2006.01) |
| C09K 13/00 | (2006.01) |

(52) U.S. Cl.
CPC ......... *C08G 18/792* (2013.01); *C08G 18/2885* (2013.01); *C08G 18/73* (2013.01); *C08G 18/755* (2013.01); *C08G 18/7831* (2013.01); *C09K 8/035* (2013.01); *C09K 8/52* (2013.01); *C09K 8/602* (2013.01); *C09K 8/68* (2013.01); *C09K 13/00* (2013.01); *C11D 3/3726* (2013.01)

(58) Field of Classification Search
None
See application file for complete search history.

(56) References Cited

U.S. PATENT DOCUMENTS

| | | | |
|---|---|---|---|
| 2,723,999 | A | 11/1955 | Cowen et al. |
| 3,591,547 | A | 7/1971 | Boudakian et al. |
| 3,952,075 | A | 4/1976 | Nakamura et al. |
| 4,540,765 | A * | 9/1985 | Koemm et al. ............ 528/45 |
| 4,841,007 | A | 6/1989 | Zdrahala et al. |
| 5,107,033 | A | 4/1992 | Pechhold |
| 5,597,874 | A | 1/1997 | Anton et al. |
| 5,605,956 | A * | 2/1997 | Anton et al. ............ 524/590 |
| 5,672,673 | A | 9/1997 | Kirchmeyer et al. |
| 2009/0054570 | A1 | 2/2009 | Wu et al. |

FOREIGN PATENT DOCUMENTS

| | | |
|---|---|---|
| EP | 0749994 A12 | 12/1996 |
| JP | 50059330 A | 5/1975 |
| JP | 50059331 A | 5/1975 |
| JP | 63245492 | 3/1987 |
| JP | 2010126607 | 6/2010 |
| KR | 102005090233 A | 9/2005 |
| WO | 2010025398 A1 | 3/2010 |

OTHER PUBLICATIONS

Thomas et al (Macromolecules 31:4595-4604, 1998).*
Simeone, et al. "Fundamental Properties of Fluoropolyether-Based Resins and Related Coatings," Centro Ricerche & Sviluppo, Ausimont S.p.A., Bollate, 2002, Italy, Angewandte Makromolekulare Chemie (1996), 236, 111-27. (ISSN: 0003-3146).
Mashlyakovskiy, et al. "Fluoropolyethers End-Capped by Polar Functional Groups. I. Kinetic Approach to the Reaction of Hydroxy-Terminated Fluoropolyethers With Cycloalyphatic and Aromatic Diisocyanates," St. Petersburg State Institute of Technology, St. Petersburg, 198013, Russia Journal of Polymer Science, Part A: Polymer Chemistry (1999), 37(5), 557-570. (ISSN: 0887-624X).
Mureau , et al. "Preparation and Evaluation of Monodisperse Nonionic Surfactants Based on Fluorine-Containing Dicarbamates," Laboratoire de Chimie des Materiaux Organiques et Metalliques (C.M.O.M.), Universite de Nice-Sophia Antipolis, Nice, 06108, Fr. Journal of Colloid and Interface Science (2000), 229(2), 440-444. (ISSN: 0021-9797).
Khomko, et al. "Fluoropolyethers End-Capped by Polar Functional Groups. IV. A Novel Approach to the Evaluation of Reactivities of Hydroxy-Terminated Ethoxylated Fluoropolyethers in the Tin(IV)-Catalyzed Reactions With Isophorone Diisocyanate," St. Petersburg State Institute of Technology, St. Petersburg, 190013, Russia, Journal of Polymer Science, Part A: Polymer Chemistry (2004), 42(21), p. 5354-5371. (ISSN: 0887624X).
Trombetta , et al. "Fluorinated Segmented Polyurethane Anionomers for Water-Oil Repellent Surface Treatments of Cellulosic Substrates," R&T Center, Solvay-Solexis S.p.A., Bollate, 20021, Italy Journal of Applied Polymer Science (2005), 98(3), p. 1364-1372. (ISSN: 0021-8995).
Ge, et al. "Synthesis, Characterization and Properties of a Novel Fluorinated Polyurethane," School of Materials Science and Engineering, Beijing Institute of Technology, Beijing, 100081, Peop. Rep. China European Polymer Journal (2009), 45(2), p. 530-536. (ISSN: 0014-3057).
Honda, et al. "Molecular Aggregation Structure and Surface Properties of Poly(fluoroalkylacrylate) Thin Films", Macromolecules (2005), 38(13), 5699-5705.
Martens, C.R. "Emulsion and Water-Soluble Paints and Coatings" (Reinhold Publishing Corporation, New York, NY, 1965).
Delebecq, E., Pascault, J.-P., Boutevin B., Ganachaud, F. (2013). "On the Versatility of Urethane/Urea Bonds: Reversibility, Blocked Isocyanate, and Non-Isocyanate Urethane". Chemical Reviews 113: 80-118.
Berliinova et al., Thermally induced hydrogel formation in aqueous solutions of poly(N-isoproylacrylaminde) and fluorocarbon-modified poly(oxyethylene)s, Polymer, 43, 2002, 7243-7250.

* cited by examiner

*Primary Examiner* — Craig Ricci

(57) ABSTRACT

The present invention comprises fluorinated ethoxylated polyurethanes of formula $[R_f\text{—}(X)_n\text{—}(CH_2CHR^1\text{—}O)_m\text{—}CH_2CH_2\text{—}O\text{—}C(O)\text{—}NH]_p\text{-}A$, wherein $R_f$ is a $C_1$ to $C_6$ perfluoroalkyl; X is a divalent radical; n is 0 or 1; R1 is H or $C_1$ to $C_4$ alkyl; m is 1 to 20; p is a positive integer of at least 2; and A is the residue of a polyisocyanate, and methods for altering surface behavior of liquids using such compounds.

4 Claims, No Drawings

FLUORINATED ETHOXYLATED POLYURETHANES

FIELD OF THE INVENTION

This invention relates to fluorinated ethoxylated polyurethanes and methods for use in altering surface behavior. Compounds of this invention are particularly useful for coatings, floor polishes, foaming, etching, and oil field applications.

BACKGROUND OF THE INVENTION

Fluorinated ethoxylates are useful as surfactants in various applications. Commercially available fluorinated ethoxylates generally contain perfluoroalkyl terminal chains. Honda, et al. in, "Molecular Aggregation Structure and Surface Properties of Poly(fluoroalkylacrylate) Thin Films", Macromolecules (2005), 38(13), 5699-5705, discusses the effect of chain length on efficacy of surface modification behaviors. For perfluoroalkyl compounds having eight or more carbons, the backbone of the polymer is in a parallel configuration. For perfluoroalkyl compounds having fewer perfluoroalkyl carbons, the compounds undergo reorientation. This reorientation decreases or eliminates the ability for exhibiting effective surface properties. Due to the high cost of producing long chain perfluoroalkyls, shorter chain perfluoroalkyls that can deliver the same or better performance are desired.

It is also desired to have fluorinated surfactants that demonstrate low foaming in use and have quicker foam disintegration, and are also stable in acidic, basic or brine solutions. Such solutions are used in applications such as cleaners, photovoltaic etching, and oil field drilling, stimulating, and other subterranean operations. Many surfactants known for low foaming, such as phosphates, are not stable in acidic, basic or brine formulations.

U.S. Pat. No. 5,597,874 discloses a coating composition comprising a) a perfluorinated acrylic polymer and b) a partially reacted fluorinated ethoxylated organic polyisocyanate crosslinking agent containing free isocyanate groups for use in clear coats over pigmented base coat.

It is desirable to have short chain perfluorinated ethoxylated compounds for use as surfactants, particularly in floor polishes and finishes, and in oil field applications. It is also desirable that such surfactants exhibit fast foam disintegration and be stable in acidic, basic or brine solutions. The present invention meets these needs.

SUMMARY OF THE INVENTION

The present invention comprises a compound of Formula 1

$$[R_f—(X)_n—(CH_2CHR^1—O)_m—CH_2CH_2—O—C(O)—NH]_p\text{-}A \quad \text{Formula 1}$$

wherein $R_f$ is a $C_1$ to $C_6$ perfluoroalkyl; X is a divalent radical; n is 0 or 1; $R^1$ is H or $C_1$ to $C_4$ alkyl; m is 1 to 20; p is a positive integer of at least 2; and A is the residue of a polyisocyanate.

The present invention further comprises a method of altering the surface behavior of a liquid comprising adding to the liquid the compound of Formula 1, as defined above.

DETAILED DESCRIPTION

Trademarks are shown herein in upper case.

The term "residue" is used herein in the definition of group A in Formula 1 to describe the portion of a polyisocyanate having 2 or more NCO moieties after removal of the terminal or active NCO moieties. For example, if the isocyanate is hexamethylene diisocyanate having the following structure

then A is

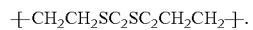

If the isocyanate is the isocyanurate trimer having the following structure

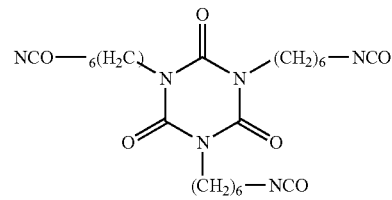

then A is

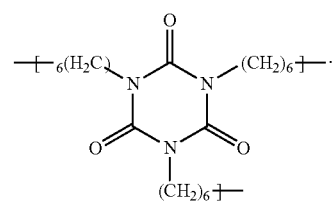

The term "polyisocyanate" is used herein to mean an isocyanate having at least 2 NCO moieties, and includes homopolymers of an isocyanate having 2 or more NCO moieties.

The present invention comprises a compound of Formula 1

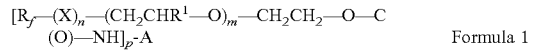

wherein $R_f$ is a $C_1$ to $C_6$ perfluoroalkyl; X is a divalent radical; n is 0 or 1; $R^1$ is H or $C_1$ to $C_4$ alkyl; m is 1 to 20; p is a positive integer of at least 2; and A is the residue of a polyisocyanate.

Preferred compounds of Formula (1) are those wherein $R_f$ is a $C_2$ to $C_6$ perfluoroalkyl, more preferably a $C_4$ to $C_6$ perfluoroalkyl. Also preferred are those compounds of Formula (1) wherein X is —O—, —CH$_2$O—, —CH$_2$—, —CH$_2$CH$_2$O—, or —S(O)$_2$N(R$^2$)CH$_2$CH$_2$O— wherein $R^2$ is $C_1$ to $C_4$ alkyl. Compounds of Formula 1 are also preferred wherein m is 2 to 15, more preferably 3 to 11. Compounds of Formula 1 wherein n is 0 are preferred, as are those wherein p is 2 or 3. Also preferred are those compounds of Formula 1 wherein A is the residue of a diisocyanate, triisocyanate, or a homopolymer of a diisocyanate or triisocyanate, in particular isophorone diisocyanate, hexamethylene diisocyanate, hexamethylene diisocyanate trimer, or a diisocyanate trimer of formula (IIa), (IIb), (IIc), and (IId):

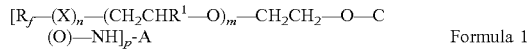

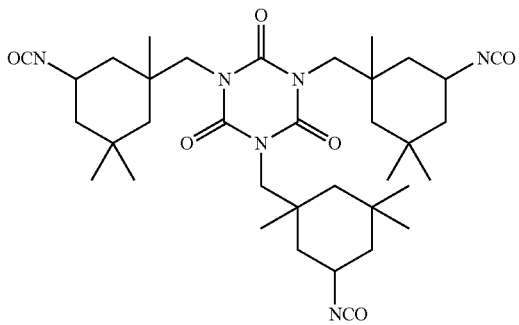
(IIa)

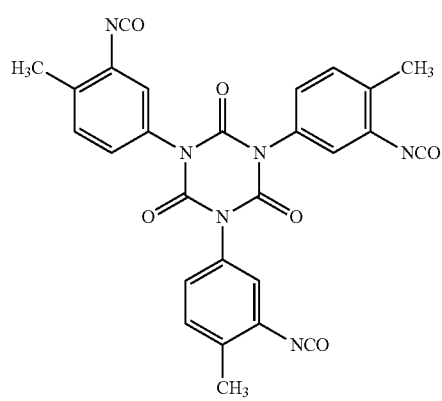
(IIb)

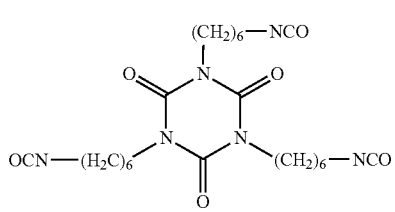
(IIc)

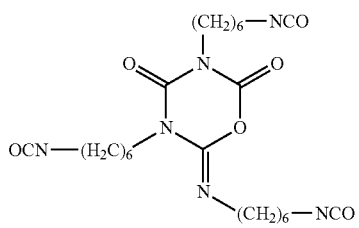
(IId)

The compounds of the present invention have several uses and advantages. The compounds provide surface effects to liquid media and to substrates treated therewith. Such surface effects include a lowering of surface tension, leveling and wetting, low foaming, and decreased foam stability or fast foam disintegration. The compounds of the present invention also provide the advantage of stability in brine and aggressive media, such as acids and bases.

Compounds of Formula 1 are prepared by contacting a perfluorinated alcohol with a polyisocyanate. Suitable perfluorinated alcohols for use in the preparation of compounds of Formula 1 are defined by Formula 2

$$R_f-(X)_n-(CH_2CHR^1-O)_m-CH_2CH_2-OH \qquad \text{Formula 2}$$

wherein $R_f$, X, n, $R^1$, and m are as defined above for Formula 1. Compounds of Formula 2 are commercially available from E. I. du Pont de Nemours and Company, Wilmington, Del. Suitable polyisocyanates for use in the preparation of compounds of Formula 1 include diisocyanates, triisocyanates, and homopolymers of diisocyanates and triisocyanates. For example one can use hexamethylene diisocyanate, or hexamethylene diisocyanate homopolymers prepared from the formula

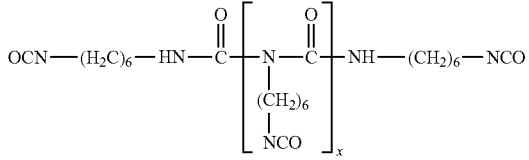

wherein x is an integer greater than or equal to 1, preferably between 1 and 8. Because of their commercial availability, mixtures of such hexamethylene diisocyanate homopolymers are preferred for use in the present invention. Also suitable for use herein are hydrocarbon diisocyanate-derived isocyanurate trimers, an example of which can be represented by the formula

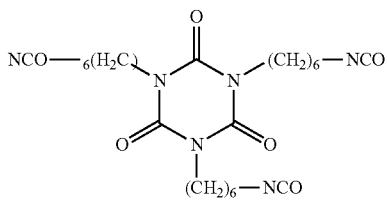

Other trimers wherein the $(CH_2)_6$ group is replaced by other hydrocarbon groups, including aliphatic, aromatic, or arylaliphatic groups, in particular hexamethylene, toluene, or cyclohexylene, are also suitable for use herein. Other polyisocyanates useful in the present invention include triisocyanates obtained by reacting three moles of toluene diisocyanate with 1,1,1-tris-(hydroxymethyl)ethane or 1,1,1-tris (hydroxymethyl)propane; isocyanurate trimer of toluene diisocyanate; isocyanurate trimer of 3-isocyanatomethyl-3,4,4-trimethylcyclohexyl isocyanate; methane-tris-(phenylisocyanate); bis-(4-isocyanatocylohexyl)methane; or one or more cyclic isocyanates selected from the group consisting of 2,4-toluene diisocyanate; 2,6-toluene diisocyanate; diphenylmethane 4,4'-diisocyanate; diphenylmethane 2,4'-diisocyanate; 3-isocyanatomethyl-3,4,4-trimethylcyclohexyl isocyanate; bis-(4-isocyanatocylohexyl)methane; and diisocyanate trimers of formula (IIa), (IIb), (IIc), and (IId):

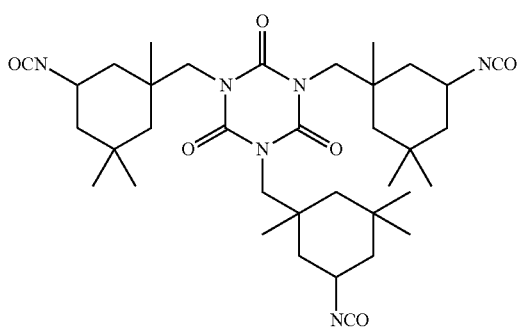
(IIa)

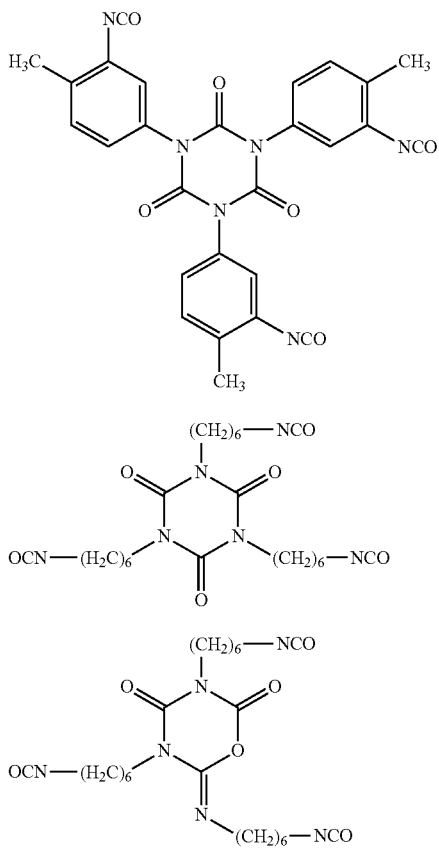

These polyisocyanates are commercially available from Bayer Corporation, Pittsburgh, Pa.

The perfluorinated alcohol and the polyisocyanate are contacted in the presence of a metal catalyst, such as iron trichloride or tin tetrachloride, and/or solvent, such as methyl isobutyl ketone (MIBK), at about 85° C. Usually an excess of the alcohol is employed, and the reaction is continued until no active isocyanate groups remain. Periodic testing for active isocyanates is conducted and additional alcohol of Formula 2 is added if active isocyanates are detected. The reaction is typically continued for several hours or overnight. The reaction mixture is then cooled and the solvent removed to provide the product of Formula 1.

Compounds of Formula 2, wherein X is $CH_2CH_2$—O can also be prepared by contacting compounds of Formula 3, $R_f$—$CH_2CH_2$—OH  (Formula 3)

wherein $R_f$ is as defined above in Formula 1, with ethylene oxide in the presence of a boron containing initiator and an iodide salt catalyst at about 150° C.

Compounds of Formula 3 are commercially available or by synthesis. For example, fluorinated alcohols $C_6F_{13}CH_2CH_2OH$ and $C_4F_9CH_2CH_2OH$ are commercially available from E. I. du Pont de Nemours and Company, Wilmington, Del. Fluorinated alcohols are also available by synthesis. Fluorinated alcohols of Formula 3 are synthesized by first reacting perfluoroalkyl iodides having 1 to 6 carbons with excess ethylene as described in U.S. Pat. No. 3,979,469 to provide the perfluoroalkyl ethylene iodides of Formula 4

$R_f$—$CH_2CH_2$—I  Formula 4 wherein $R_f$ is as defined above for Formula 1. The perfluoroalkyl ethylene iodides of Formula 4 are treated with oleum and hydrolyzed according to procedures disclosed in WO 95/11877.

Another embodiment of the present invention comprises a compound which is the product of the reaction of (1) a compound of the formula $R_f$—$(X)_n$—$(CH_2CHR^1$—$O)_m$—$CH_2CH_2$—OH  (Formula 2)

wherein $R_f$ is a $C_1$ to $C_6$ perfluoroalkyl; X is a divalent radical; n is 0 or 1; $R^1$ is H or $C_1$ to $C_4$ alkyl; and m is 1 to 20; with (2) at least one polyisocyanate containing at least 3 isocyanate groups. Preferably X is —O—, —$CH_2O$—, —$CH_2$—, —$CH_2CH_2O$—, or —$S(O)_2N(R^2)CH_2CH_2O$— wherein $R^2$ is $C_1$ to $C_4$ alkyl. The product of this reaction is a compound of Formula 1 as defined above wherein subscript p is three or higher. Suitable perfluorinated alcohols for use in the preparation of compounds of Formula 1 wherein p is 3 or higher are those of Formula 2 as previously described. Suitable polyisocyanates for use in this reaction are isocyanates having 3 or more NCO groups. Preferred are homopolymers of diisocyanates or triisocyanates as previously described, and other isocyanates, such as isocyanurate trimers as previously described. The reaction is conducted as previously described using an excess of the perfluorinated alcohol so that no reactive isocyanate groups remain.

The present invention further comprises a method of altering the surface behavior of a liquid comprising contacting with the liquid the compound of Formula (1) as defined above or mixtures thereof. Compounds of Formula (1) are present in the liquid at a concentration of from about 0.001% to about 50% by weight. Preferably, the concentration is from about 0.01% to about 10% by weight, more preferably from about 0.1% to about 8% by weight, and more preferably from about 0.1% to about 5% by weight. Surface behaviors include lowering surface tension, leveling, wetting, etching, foaming, decreasing foam stability, or combinations thereof. In the present invention, compounds of Formula 1 or mixtures thereof, can be blended with or added to the liquid. Alternately, the compounds of Formula 1 can be applied to a substrate prior to contacting the liquid with the substrate, thereby providing uniform coverage of the liquid when being applied to the substrate.

One embodiment of the present invention is a method of lowering the surface tension of a liquid comprising adding a compound of Formula 1, or mixtures thereof, to the liquid. Preferably, the surface tension of the liquid is lowered to 23 mN/m (milli-Newton per meter) or less at a concentration of 0.1% by weight of a compound or compounds of Formula 1 in the liquid, more preferably to 22 mN/m or less at a concentration of 0.1% by weight, and more preferably to 20 mN/m or less at a concentration of 0.1% by weight.

In the present invention, compounds of Formula 1 can be added to a variety of liquids to alter surface behavior. The liquid can be aqueous, an acid, a base, or brine. Examples of liquids useful in the present invention are coating compositions, latex, polymers, floor finishes, inks, emulsifying agents, foaming agents, wetting agents, penetrating agents, electroplating agents, corrosion inhibitors, cleaners, etchant solutions, dispersion aids, release agents, rinsing aids, polishing agents, personal care compositions, drying agents, antistatic agents, floor polishes, water, drill fluids, well fluids, stimulation fluids, or combinations thereof.

The method of the present invention improves the performance of the liquid in several applications. Preferred applications where the present invention improves performance include uses in cleaning solutions, floor finishes, inks, floor polishes, etching solutions, stimulation treatment in oil or gas wells, and in drill fluids, well fluids, or other subterranean fluids in oil or gas wells.

The present invention further comprises a method of altering the surface behavior of a substrate. The altering of surface behavior is provided by contacting a compound of Formula 1 with the substrate. Compounds of Formula 1 are often added to a coating base prior to deposition on the substrate to provide leveling and wetting. "Leveling or wetting" as used herein refers to the uniformity of coverage of the coating when applied to a substrate. It is undesirable to have streaking, surface defects, or withdrawal of the coating from the substrate surface at the edges or otherwise. An even coating will provide a superior dried coating on the substrate surface. Suitable coating compositions, referred to herein by the term "coating base", include a composition, typically a liquid formulation, of an alkyd coating, Type I urethane coating, unsaturated polyester coating, or water-dispersed coating, and is applied to a substrate for the purpose of creating a lasting film on the substrate surface. These are conventional paints, stains, and similar coating compositions.

By the term "alkyd coating" as used herein is meant a conventional liquid coating based on alkyd resins, typically a paint, clear coating, or stain. The alkyd resins are complex branched and cross-linked polyesters containing unsaturated aliphatic acid residues. Conventional alkyd coatings utilize, as the binder or film-forming component, a curing or drying alkyd resin. Alkyd resin coatings contain unsaturated aliphatic acid residues derived from drying oils. These resins spontaneously polymerize in the presence of oxygen or air to yield a solid protective film. The polymerization is termed "drying" or "curing" and occurs as a result of autoxidation of the unsaturated carbon-carbon bonds in the aliphatic acid component of the oil by atmospheric oxygen. When applied to a surface as a thin liquid layer of formulated alkyd coating, the cured films that from are relatively hard, non-melting, and substantially insoluble in many organic solvents that act as solvents or thinners for the unoxidized alkyd resin or drying oil. Such drying oils have been used as raw materials for oil-based coatings and are described in the literature.

By the term "unsaturated polyester coating" as used hereinafter is meant a conventional liquid coating based on unsaturated polyester resins, dissolved in monomers and containing initiators and catalysts as needed, typically as a paint, clear coating, or gel coat formulation. Unsaturated polyester resins contain as the unsaturated prepolymer the product obtained from the condensation polymerization of a glycol such as 1,2-propylene glycol or 1,3-butylene glycol with an unsaturated acid such as maleic (or of maleic and a saturated acid, e.g., phthalic) in the anhydride form. The unsaturated prepolymer is a linear polymer containing unsaturation in the chain. This is dissolved in a suitable monomer, for instance styrene, to produce the final resin. The film is produced by copolymerization of the linear polymer and monomer by means of a free radical mechanism. The free radicals can be generated by heat, or more usually by addition of a peroxide, such as benzoyl peroxide, separately packaged and added before use. Such coating compositions are frequently termed "gel coat" finishes. For curing coatings at room temperature, the decomposition of peroxides into free radicals is catalyzed by certain metal ions, usually cobalt. The solutions of peroxide and cobalt compound are added separately to the mix and well stirred before application. The unsaturated polyester resins that cure by a free radical mechanism are also suited to irradiation curing using, for instance, ultraviolet light. This form of cure, in which no heat is produced, is particularly suited to films on wood or board. Other radiation sources, for instance electron-beam curing, are also used.

By the term "water-dispersed coatings" as used herein is meant coatings intended for the decoration or protection of a substrate composed of water as an essential dispersing component such as an emulsion, latex, or suspension of a film-forming material dispersed in an aqueous phase. "Water-dispersed coating" is a general classification that describes a number of formulations and includes members of the above described classifications as well as members of other classifications. Water-dispersed coatings in general contain other common coating ingredients. Water-dispersed coatings are exemplified by, but not limited to, pigmented coatings such as latex paints, non-pigmented coatings such as wood sealers, stains, and finishes, coatings for masonry and cement, and water-based asphalt emulsions. A water dispersed coating optionally contains surfactants, protective colloids and thickeners, pigments and extender pigments, preservatives, fungicides, freeze-thaw stabilizers, antifoam agents, agents to control pH, coalescing aids, and other ingredients. For latex paints the film forming material is a latex polymer of acrylate acrylic, vinyl-acrylic, vinyl, or a mixture thereof. Such water-dispersed coating compositions are described by C. R. Martens in "Emulsion and Water-Soluble Paints and Coatings" (Reinhold Publishing Corporation, New York, N.Y., 1965).

By the term "dried coating" as used herein is meant the final decorative and/or protective film obtained after the coating composition has dried, set or cured. Such a final film can be achieved by, for non-limiting example, curing, coalescing, polymerizing, interpenetrating, radiation curing, UV curing or evaporation. Final films can also be applied in a dry and final state as in dry coating.

When added to a coating base in the method of the present invention the compounds of Formula 1 as defined above are effectively introduced to the coating base or other composition by thoroughly stirring it in at room or ambient temperature. More elaborate mixing can be employed such as using a mechanical shaker or providing heat or other methods. Such methods are not necessary and do not substantially improve the final composition. When used as an additive to latex paints, the compositions of the invention generally are added at about 0.001% by weight to about 5% by weight by dry weight of the compound of Formula 1 in the wet paint. Preferably about from about 0.01% by weight to about 3% by weight, more preferably from about 0.01% by weight to about 1% by weight, and more preferably from about 0.1% by weight to about 0.5% by weight is used.

The method of the present invention is suitable for use in floor waxes, polishes, or finishes (hereinafter "floor finishes"). These floor finishes are generally water based or solvent based polymer emulsions. Commercially available floor finish compositions typically are aqueous emulsion-based polymer compositions comprising one or more organic solvents, plasticizers, coating aides, anti-foaming agents, surfactants, polymer emulsions, metal complexing agents, and waxes. The particle size range and solids content of the polymer are usually controlled to control the product viscosity, film hardness and resistance to deterioration. Polymers containing polar groups function to enhance solubility and may also act as wetting or leveling agents providing good optical properties such a high gloss and distinctness of reflected image.

Preferred polymers for use in floor finishes include acrylic polymers, polymers derived from cyclic ethers, and polymers derived from vinyl substituted aromatics. Acrylic polymers include various poly(alkyl acrylates), poly(alkyl methacrylates), hydroxyl substituted poly(alkyl acrylates) and poly(alkyl methacrylates). Commercially available acrylic copolymers used in floor finishes include, for example, methyl methacrylate/butyl acrylate/methacrylic acid (MMA/BA/MAA) copolymers; methyl methacrylate/butyl acrylate/acrylic acid (MMA/BA/AA) copolymers, and others. Commercially available styreneacrylic copolymers include styrene/methyl methacrylate/butyl acrylate/methacrylic acid (S/MMA/BA/MMA) copolymers; styrene/methyl methacrylate/butyl acrylate/acrylic acid (S/MMA/BA/AA) copolymers; and others. Polymers derived from cyclic ethers usually contain 2 to 5 carbon atoms in the ring with optional alkyl groups substituted thereon. Examples include various oxiranes, oxetanes, tetrahydrofurans, tetrahydropyrans, dioxanes, trioxanes, and caprolactone. Polymers derived from vinyl substituted aromatics include for example those made from styrenes, pyridines, conjugated dienes, and copolymers thereof. Polyesters, polyamides, polyurethanes and polysiloxanes are also used in floor finishes.

The waxes or mixtures of waxes that are used in floor finishes include waxes of a vegetable, animal, synthetic, and/or mineral origin. Representative waxes include, for example, carnuba, candelilla, lanolin, stearin, beeswax, oxidized polyethylene wax, polyethylene emulsions, polypropylene, copolymers of ethylene and acrylic esters, hydrogenated coconut oil or soybean oil, and the mineral waxes such as paraffin or ceresin. The waxes typically range from 0 to about 15 weight percent and preferably from about 2 to about 10 weight percent based on the weight of the finish composition.

When added to a floor finish, the compounds of Formula 1, as defined above, are effectively introduced to the composition by thoroughly stirring it in at room or ambient temperature. More elaborate mixing can be employed such as using a mechanical shaker or providing heat or other methods. When used as an additive to floor finishes, the compounds of Formula 1 generally are added at about 0.001% by weight to about 5% by weight by dry weight of the compound of Formula 1 in the wet composition. Preferably about from about 0.01% by weight to about 3% by weight, more preferably about from about 0.01% by weight to about 1% by weight, and more preferably from about 0.1% by weight to about 0.5% by weight is used.

Floor waxes or polishes are generally water based, solvent based or polymer based. The method of the present invention is suitable for use with any of these. Water-based and polymer waxes dry to a high gloss without buffing; solvent-based wax requires vigorous buffing. Water-based wax is recommended for asphalt, vinyl, vinyl asbestos and rubber-tiled floors; solvent-based waxes produce a hard, shiny finish and are best for wood, cork and terrazzo floors. Self-polishing waxes, such as polymer or resin, will yellow or discolor and wear off in heavy traffic areas; they should be stripped off and reapplied after three or four coats.

The present invention further comprises a method of altering the surface behavior of a liquid, wherein the surface behavior is decreased foam stability, comprising contacting the liquid with a compound of Formula 1 as defined above. The method of the present invention can both create a small foam volume and disintegrate the foam in aqueous solution over a period of time. The low degree of foaming and the quick foam disintegration are useful in various applications. Foaming is an important property and can be used in aggressive cleaners, floor finish formulations, floor stripper formulations, etchant solutions and electronic cleaning applications. For etchant solutions, aggressive cleaners and electronic cleaning applications, it is undesirable to have additives that create foams which are sustainable over time. Such sustained foams require the use of defoamers during disposal and can create complications during manufacturing processes. Thus, providing foaming that is not maintained over a long time period, but instead disintegrates quickly in highly acidic and basic conditions, is desirable. The surfactants of Formula 1 of the present invention provide foams that quickly disintegrate in aqueous media. The foams provided by the compounds and methods of the present invention disintegrate in about 15 minutes in aqueous media, preferably in about 10 minutes, and more preferably in about 5 minutes. Thus, the surfactants of Formula 1 and the method of providing foam disintegration of the present invention are useful in these applications.

For foam disintegration applications, the compounds of Formula 1 are typically simply blended with or added to the liquid. When added to liquids to attempt to disintegrate foaming, the compounds of Formula 1 are effectively introduced to the liquid by thoroughly stirring it in at room or ambient temperature. A low concentration of surfactant in the liquid of a minimum of about 0.01% by weight, preferably about 0.02% by weight, more preferably about 0.05% by weight, and more preferably about 0.1% by weight is sufficient to provide foam disintegration.

In another embodiment of the present invention, the methods of the present invention are useful in gas and oil field applications, in particular in subterranean operations. Herein a hydrocarbon is defined as either a gas or oil product which is produced or recovered from a subterranean zone. A well or well bore is drilled and created to penetrate such a hydrocarbon containing subterranean zone. The method of the present invention is useful to provide a surfactant to modify and improve the wettability and surface conditions, such as the surface tension of the subterranean formation around the well bore, and is also useful to improve the permeability and flow rate to enhance oil well or gas well recovery and productivity.

The term "drill fluids" as used herein means those liquids that are added to a well or well bore penetrating a subterranean zone containing hydrocarbon or gas prior to or during a drilling operation. Examples can include water, brine, solvent, hydrocarbons, surfactants, oils, kerosene, fracturing fluids, stimulating fluids, oil-based drill muds, clay stabilizers, treatment fluids, and mixtures thereof.

The term "well fluids" as used herein means those liquids that occur in or are added to a well or well bore penetrating a subterranean zone containing hydrocarbon or gas. Examples can include drill fluids, water, brine, solvent, hydrocarbons, surfactants, oils, kerosene, fracturing fluids, stimulating fluids, oil based drill muds, clay stabilizers, treatment fluids, and mixtures thereof.

The term "liquid treatment stream or gas treatment stream" as used herein means a liquid composition or gas composition, or a combination thereof, injected into a well penetrating a subterranean zone containing hydrocarbon or gas, or into a well bore area, in the operation of extracting the hydrocarbon or gas. Examples can include steam, drill fluids, well fluids, stimulating fluids, water, brine, solvent, hydrocarbons, surfactants, fracturing fluids, oil-based drill muds, clay stabilizers, treatment fluids, and mixtures thereof.

The present invention provides a surfactant or foam disintegration fluid which comprises the compounds of Formula 1 and a liquid, wherein the compound of Formula 1 is present at a concentration range of from about 0.001% to about 50% by weight, preferably a range of from about 0.01% to about 40%, more preferably a range of from about 0.01% to about 30% by weight, and more preferably a range of from about 0.05% to about 20% by weight in the liquid.

The present invention comprises a method of lowering the surface tension within a subterranean formation containing hydrocarbons comprising adding a compound of Formula 1 as described above to a liquid which is a carrier contacted with the subterranean formation. One method of contacting is injection of the carrier or liquid into the subterranean formation, for example by using a downhole, well, or well bore. The compound of Formula 1 is added to a carrier or liquid such as a fluid or gas which will be in contact with the subterranean formation during operations to remove oil or gas from the formation. Examples include drill fluids, well fluids, stimulation fluids, liquid treatment stream, gas treatment stream, fractionating fluids, clay stabilizers, or other liquids or gases employed when extracting the hydrocarbons from the formation. The methods of the present invention employing compounds of Formula 1 can be used in one or more of a pretreatment stage of injection of a pre-flush of various liquids, or in a matrix or stimulation activities; in the main stage in various carrier fluids, or in a soaking of the formation for a specific time period; or in a post treatment stage for displacement operation to achieve better placement of the fluids containing the surfactant composition. The compound of Formula 1 is used in the media in the form of a liquid, emulsion, dispersion, or foaming agent.

Another advantage of contacting a subterranean formation containing hydrocarbons with the compounds of Formula 1 as defined above, is providing a method for stimulating production of hydrocarbons during operations to extract hydrocarbons from a subterranean formation. The method of the present invention employs the compounds of Formula 1 as stimulation fluid additives for stimulation activities, such as hydraulic fracturing and acidizing. In these situations the surfactants improve the wetting of the stimulation fluid on the formation surface (rock) to allow for deeper penetration and better stimulation of the well bore region. The low surface tension of these additives permits the stimulation fluids to be more efficiently and easily recovered from downhole using the method of the present invention. As a result, the well will be able to more effectively produce gas and oil.

The method of the present invention is further useful to provide an aid to prevent and remedy water blocks or condensate blocks in wells and well bore areas. It is known that water can accumulate near the well bore of an oil or gas well and decrease productivity by decreasing the relative permeability of the oil or gas, which is called water block. In addition liquid hydrocarbons can also accumulate and cause a decrease in productivity in gas wells near or far from the well bore region known as condensate block. The compounds used in the method of the present invention can be used to help in removal of at least a portion of such accumulations of liquids in a water block or condensate block, or for reducing or preventing the formation of the accumulation of liquids in such blocks. The surfactant employed in the method of the present invention is useful as a surfactant additive in drill fluids, well fluids and treatment fluids for subterranean formation to alter the wettability and permeability by its surface active properties. Such surfactants, for example, are used within the porous rock liquid of subterranean formation and can result in pressure changes or as foams can block the gas drain paths and result in the oil/gas recovery increases.

The compounds and methods of the present invention have several uses and advantages as detailed above. The compounds and methods provide surface effects to liquid media and substrates, such as lowering of surface tension, leveling and wetting, low foaming, and decreased foam stability. The compounds of the present invention also provide the advantage of stability in brine and aggressive media, such as acids and bases. The compounds of the invention, containing a perfluoroalkyl of 6 or fewer carbons, provide comparable or superior surface effects compared to prior art compounds having perfluoroalkyls of 8 or more carbons. Thus the invention provides fluorine efficiency in that the same or better surface effects can be obtained while using less fluorine. Use of less fluorine is more economical.

Test Methods and Materials

The following test methods and materials (intermediates) were used in the Examples herein.

Test Methods

Test Method 1—Surface Tension Measurement

The surface tension of the examples was measured via a Kruss Tensiometer, K11 Version 2.501, in accordance with instructions with the equipment. The Wilhelmy Plate method was used. A vertical plate of known perimeter was attached to a balance, and the force due to wetting was measured. Ten replicates were tested of each dilution, and the following machine settings were used: Plate Method SFT, 1.0 sec interval, 40.2 mm wetted length, 10 reading limit, 2 dynes/cm min Standard Deviation, and 9.80665 m/s2 Gr. Acc. Lower surface tension indicated superior performance.

A stock solution was prepared for the highest concentration of fluorosurfactant example to be analyzed. The concentration of the solutions was by percent active ingredient, weight percent or fluorine content. This stock solution was prepared in deionized water and in 2% KCl in water, or in 15% HCl in water depending on the desired application for which the surface tension was being measured. The stock solution was stirred overnight (for approximately 12 hours) to ensure complete mixing. Additional concentrations of the fluorosurfactant example for analysis were made by diluting the stock solution according to the equation $M_iV_i=M_fV_f$, where $M_i$ is the concentration of the stock solution, $M_f$ is the concentration of the final solution, $V_f$ is the final volume of the sample, and $V_i$ is the volume of the stock solution that is needed in order to formulate the final sample. The concentration dilution samples were shaken thoroughly and then left to sit undisturbed for 30 minutes. These samples were then mixed and poured into a small container. Solutions of 2% KCl are typically used in the surface tension measurements for oilfield applications because they mimic the stimulation fluid types that are pumped down hole into wells. The 2% KCl solution was similar to the salinity of the fracture fluids that are used to hydraulically fracture a well. The surface tension was measured using a Kruss Tensiometer, K11 Version 2.501 in accordance with instructions with the equipment as described above. Lower surface tension values indicated superior performance.

Test Method 2—Leveling and Wetting Test

To test the performance of the samples in their wetting and leveling ability, the following examples were added to a floor polish (RHOPLEX® 3829, Formulation N-29-1, available from Rohm & Haas, Philadelphia, Pa.) and applied to half of a thoroughly cleaned 12 inch×12 inch (30.36 cm×30.36 cm) vinyl tile (available from Interfuse Vinyl Tiles by Estrie, Sherbrooke, QC Canada). The tiles were thoroughly cleaned by wetting the tiles, adding a powdered oxygen bleach cleanser and scrubbing using a green SCOTCH-BRITE scouring pad, available from 3M Company, St. Paul Minn.). This scrubbing procedure was used to remove the pre-existing coating on the tiles. The tiles initially had a uniform shiny finish; a uniform dull finish indicated coating removal. The tiles were then air-dried overnight. A 1% by weight solution of the compounds to be tested were prepared by dilution in deionized water. Following the resin manufacturer protocols, a 100 g portion of the RHOPLEX® 3829 Formulation N-29-1 was prepared, followed by addition of 0.75 g of the 1% by weight compound solutions, to provide a test floor polish.

The test floor polish was applied to the tile by placing 3 mL portion of the test polish in the center of the tile, and spreading from top to bottom using a cheesecloth applicator, and finally placing a large "X" across the tile, using the applicator. The "X" subsequently provided visual evidence of leveling at the rating step. The applicator was prepared from a two-layer 18×36 inch (46×91 cm) sheet of cheesecloth (from VWR, West Chester Pa.), folded twice into an eight-layer pad. One corner of the pad was then used as the applicator. The tile was allowed to dry for 30 min. and a total of 5 coats were applied and dried, with the X test performed after each coating had been dried.

TABLE 1

Visual Tile Rating Scale for Leveling

| Score | Description | Rating |
|---|---|---|
| 1 | Uneven surface coverage of the film, significant streaking and surface defects. | Poor |
| 2 | Numerous surface defects and streaks are evident but, generally, film coats entire tile surface. | Below Average |
| 3 | Visible streaking and surface defects, withdrawal of the film from the edges of the tile. | Average |
| 4 | Minor surface imperfections or streaking | Above Average |
| 5 | No visible surface defects or streaks | Excellent |

Test Method 3—Blender Foaming

The test procedure used to evaluate the foaming was a modified version of the blender foaming test ASTM D3519-88. A blender, graduated cylinder, glass sample bottles and a stop watch were employed. First, stock solutions of the testing base solutions were made. These solutions were prepare using tap water and also for artificial sea water (10% by weight sodium chloride in water). Samples of 100 mL of the compounds at 0.1% active ingredient in the desired base testing solution were prepared and stirred overnight to ensure complete mixing. The blender was cleaned with deionized water, then acetone, and then de-ionized water again. Once clean, the blender was assembled for use. The test fluid sample of 100 mL was poured into the blender jar. The temperature of the test fluid was measured with a thermometer and recorded. The blender was then run for 20 seconds at 50-60% power. After 20 seconds, the liquid and foam were immediately poured into a 500 mL graduated cylinder. The initial liquid and foam height were measured in mL. The liquid and foam height were again measured at 5, 10 and 15 minutes. During this time, any observations of the foam were recorded such as its density or persistency. A larger height (in mL) of the foam indicated that the sample foamed more. A consistently high height (in mL) of foam demonstrated persistent foam. The blender foaming test was used to measure the amount of foam produced and the persistency of the foam. A difference in foam height of up to 10 mL is produced by variation in this method.

Test Method 4—Nitrogen Bubbling Foam Test

The nitrogen bubbling foam test procedure was used to evaluate the foaming of fluorosurfactants in acidic and basic solutions for cleaning and etching application. First, stock solutions of the testing base solutions were made. These solutions were prepared in 15% HCl. Samples of 20 mL of the fluorosurfactant to be tested at 0.1% active ingredient in the desired base testing solution were prepared and stirred overnight to ensure complete mixing. The sample solution was then added to a 100 mL graduated cylinder (glass). Nitrogen was then bubbled through the solution to produce foam at a rate that filled the cylinder in 20-30 seconds. A fritted glass tube was used to bubble the nitrogen through the solution. When the foam reached the top of the cylinder, the nitrogen was turned off and a timer was started. The heights of the foam and liquid in 10 mL were measured after 30 seconds, 5 minutes, 10 minutes, and 15 minutes. Observations of the quality and persistency of the foam were also recorded. The nitrogen bubbling foam test was used as an indicator of the amount of foam that a sample produced and the persistency of that foam.

EXAMPLES

Example 1

Example 1 was prepared by adding fluoroethoxylated alcohol, $CF_3(CF_2)_5CH_2CH_2$—O—$(CH_2CH_2O)_nCH_2CH_2OH$, where n is 2.7 to 3.7 (50.0 g, commercially available from E. I. du Pont de Nemours and Company, Wilmington, Del.) to a 4-neck reaction flask equipped with a reflux condenser, additional funnel and overhead stirring. Iron chloride (0.39 g) in methyl isobutylketone (MIBK, 5 g) was added and the reaction flask was heated to 85° C. Isophorone diisocyante (5.05 g, commercially available from Bayer Corporation, Pittsburgh, Pa. as DESMODUR I) was dissolved in MIBK (30 g) and added to the reaction flask dropwise over 4 hrs. The mixture was tested for active isocyanates. If active isocyanates were present, additional fluoroethoxylated alcohol was added. The mixture was then allowed to react overnight at 85° C. The reaction mixture was then cooled, and solvent (MIBK) was distilled at 70° C. under vacuum at 100 mmHg (13.3 kPa). The final product was analyzed to be

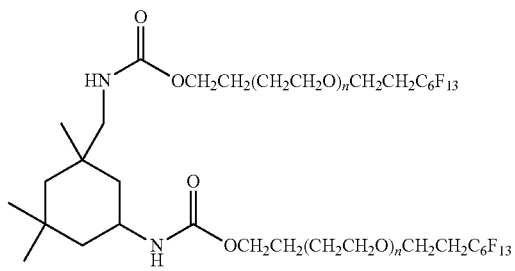

wherein n is 2.7 to 3.7. Example 1 was then tested according to the Test Methods 1 and 2 described above. Results are listed in Tables 2a and 3.

Example 2

Example 2 was prepared by adding fluoroethoxylated alcohol, $CF_3(CF_2)_5CH_2CH_2$—O—$(CH_2CH_2O)_nCH_2$ $CH_2OH$, where n is 4.6 to 6.1 (58.0 g, commercially available from E. I. du Pont de Nemours and Company, Wilmington, Del.) to a 4-neck reaction flask equipped with a reflux condenser, additional funnel and overhead stirring. Iron chloride (0.39 g) in methyl isobutylketone (MIBK, 5 g) was added and the reaction flask was heated to 85° C. Isophorone diisocyante (5.05 g, commercially available from Bayer Corporation, Pittsburgh, Pa. as DESMODUR I) was dissolved in MIBK (30 g) and added to the reaction flask dropwise over 4 hrs. The mixture was tested for active isocyanates. If active isocyanates were present, additional fluoroethoxylated alcohol was added. The mixture was then allowed to react overnight at 85° C. The reaction mixture was then cooled, and solvent (MIBK) was distilled at 70° C. under vacuum at 100 mmHg (13.3 kPa). The final product was analyzed to be

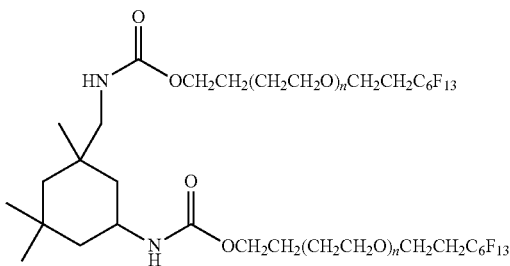

wherein n is 4.7 to 5.7. Example 2 was then tested according to the Test Methods 1 and 2 described above. Results are listed in Tables 2a and 3.

Example 3

Example 3 was prepared by adding fluoroethoxylated alcohol, $CF_3(CF_2)_5CH_2CH_2-O-(CH_2CH_2O)_nCH_2CH_2OH$, where n is 4.6 to 6.1 (1000.0 g, commercially available from E. I. du Pont de Nemours and Company, Wilmington, Del.) to a 4-neck reaction flask equipped with a reflux condenser, additional funnel and overhead stirring. Iron chloride (0.040 g) in methyl isobutylketone (MIBK, 5 g) was added and the reaction flask was heated to 85° C. Hexamethylene diisocyanate (20.0 g, commercially available from Bayer Corporation, Pittsburgh, Pa. as DESMODUR H) was dissolved in MIBK (30 g) and added to the reaction flask dropwise over 4 hrs. The mixture was tested for active isocyanates. If active isocyanates were present, additional fluoroethoxylated alcohol was added. The mixture was then allowed to react overnight at 85° C. The reaction mixture was then cooled, and solvent (MIBK) was distilled at 70° C. under vacuum at 100 mmHg (13.3 kPa). The final product was analyzed to be $CF_3(CF_2)_5CH_2CH_2-O-(CH_2CH_2O)_nCH_2CH_2O-C(O)-NH]_2-(CH_2)_6$ wherein n is 4.6 to 6.1. Example 3 was then tested according to the Test Methods 1, 2 and 3 described above. Results are listed in Tables 2a, 2b, 3, 4 and 5.

Example 4

Example 4 was prepared by adding fluoroethoxylated alcohol, $CF_3(CF_2)_5CH_2CH_2-O-(CH_2CH_2O)_nCH_2CH_2OH$, where n is 6.5 to 7.5 (65.2 g, commercially available from E. I. du Pont de Nemours and Company, Wilmington, Del.) to a 4-neck reaction flask equipped with a reflux condenser, additional funnel and overhead stirring. Iron chloride (0.39 g) in methyl isobutylketone (MIBK, 5 g) was added and the reaction flask was heated to 85° C. Isophorone diisocyante (5.05 g, commercially available from Bayer Corporation, Pittsburgh, Pa. as DESMODUR I) was dissolved in MIBK (30 g) and added to the reaction flask dropwise over 4 hrs. The mixture was tested for active isocyanates. If active isocyanates were present, additional fluoroethoxylated alcohol was added. The mixture was then allowed to react overnight at 85° C. The reaction mixture was then cooled, and solvent (MIBK) was distilled at 70° C. under vacuum at 100 mmHg (13.3 kPa). The final product was analyzed to be

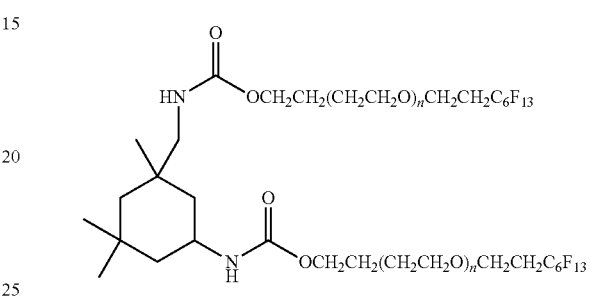

wherein n is 6.5 to 7.5. Example 4 was then tested according to the Test Methods 1 and 2 described above. Results are listed in Tables 2a and 3.

Example 5

Example 5 was prepared by adding fluoroethoxylated alcohol, $CF_3(CF_2)_5CH_2CH_2-O-(CH_2CH_2O)_nCH_2CH_2OH$, where n is 9 to 11 (200.0 g, commercially available from E. I. du Pont de Nemours and Company, Wilmington, Del.) to a 4-neck reaction flask equipped with a reflux condenser, additional funnel and overhead stirring. Iron chloride (0.008 g) in methyl isobutylketone (MIBK, 5 g) was added and the reaction flask was heated to 85° C. Isophorone diisocyante (4.0 g, commercially available from Bayer Corporation, Pittsburgh, Pa. as DESMODUR I) was dissolved in MIBK (30 g) and added to the reaction flask dropwise over 4 hrs. The mixture was tested for active isocyanates. If active isocyanates were present, additional fluoroethoxylated alcohol was added. The mixture was then allowed to react overnight at 85° C. The reaction mixture was then cooled, and solvent (MIBK) was distilled at 70° C. under vacuum at 100 mmHg (13.3 kPa). The final product was analyzed to be

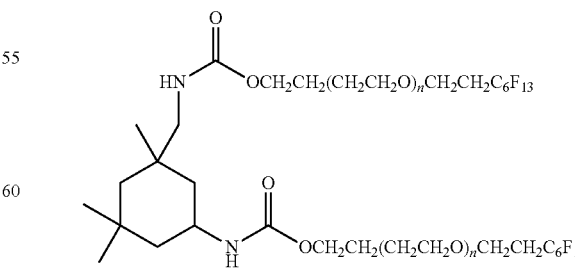

wherein n is 9 to 11. Example 6 was then tested according to the Test Methods 1, 2 and 3 described above. Results are listed in Tables 2a, 2b, 3, 4 and 5.

Example 6

Example 6 was prepared by adding fluoroethoxylated alcohol, $CF_3(CF_2)_5CH_2CH_2$—O—$(CH_2CH_2O)_nCH_2CH_2OH$, where n is 9 to 11 (20.0 g, commercially available from E. I. du Pont de Nemours and Company, Wilmington, Del.) to a 4-neck reaction flask equipped with a reflux condenser, additional funnel and overhead stirring. Iron chloride (0.195 g) in methyl isobutylketone (MIBK, 30 g) was added and the reaction flask was heated to 85° C. An aliphatic polyisocyanate resin based on hexamethylene diisocyanate (0.4 g, commercially available from Bayer Corporation, Pittsburgh, Pa. as DESMODUR N100) was dissolved in MIBK (30 g) and added to the reaction flask dropwise over 4 hrs. The mixture was tested for active isocyanates. If active isocyanates were present, additional fluoroethoxylated alcohol was added. The mixture was then allowed to react overnight at 85° C. The reaction mixture was then cooled, and solvent (MIBK) was distilled at 70° C. under vacuum at 100 mmHg (13.3 kPa). The final product was analyzed to be $[CF_3(CF_2)_5CH_2CH_2$—O—$(CH_2CH_2O)_nCH_2CH_2$—O—C(O)—$NH]_2$-A wherein A is the residue of the aliphatic polyisocyanate resin based on hexamethylene diisocyanate, n is 9 to 11, and p is higher than 3. Example 6 was then tested according to the Test Methods 1 and 2 described above. Results are listed in Tables 2a and 3.

Example 7

Example 7 was prepared by adding fluoroethoxylated alcohol, $CF_3(CF_2)_5CH_2CH_2$—O—$(CH_2CH_2O)_nCH_2CH_2OH$, where n is 9 to 11 (20.0 g, commercially available from E. I. du Pont de Nemours and Company, Wilmington, Del.) to a 4-neck reaction flask equipped with a reflux condenser, additional funnel and overhead stirring. Iron chloride (0.195 g) in methyl isobutylketone (MIBK, 30 g) was added and the reaction flask was heated to 85° C. An aliphatic polyisocyanate resin based on hexamethylene diisocyanate trimer (0.4 g, commercially available from Bayer Corporation, Pittsburgh, Pa. as DESMODUR N3300) was dissolved in MIBK (30 g) and added to the reaction flask dropwise over 4 hrs. The mixture was tested for active isocyanates. If active isocyanates were present, additional fluoroethoxylated alcohol was added. The mixture was then allowed to react overnight at 85° C. The reaction mixture was then cooled, and solvent (MIBK) was distilled at 70° C. under vacuum at 100 mmHg (13.3 kPa). The final product was analyzed to be $[CF_3(CF_2)_5CH_2CH_2$—O—$(CH_2CH_2O)_nCH_2CH_2$—O—C(O)—$NH]_2$-A wherein A is the residue of the aliphatic polyisocyanate resin based on hexamethylene diisocyanate trimer, n is 9 to 11, and p is higher than 3. Example 7 was then tested according to the Test Methods 1 and 2 described above. Results are listed in Tables 2a and 3.

Comparative Example A

Comparative Example A is a fluoroethoxylated alcohol of general formula $CF_3(CF_2)_7CH_2CH_2$—O—$(CH_2CH_2O)_yCH_2CH_2OH$ (commercially available from E. I. du Pont de Nemours and Company, Wilmington, Del.) having an average molecular weight of about 725. Comparative Example A was tested according to the Test Methods 1, 2 and 3 described above. Results are listed in Tables 2a, 2b, 3, 4 and 5.

Comparative Example B

Comparative Example B is a fluoroethoxylated alcohol of general formula $CF_3(CF_2)_7CH_2CH_2$—O—$(CH_2CH_2O)_yCH_2CH_2OH$ (commercially available from E. I. du Pont de Nemours and Company, Wilmington, Del.) having an average molecular weight greater than 725 and a higher level of ethoxylation, represented by subscript y, than Comparative Example A. Comparative Example B was tested according to the Test Methods 1 and 3 described above. Results are listed in Tables 2a, 2b, 4 and 5.

Comparative Example C

Comparative Example C was prepared by adding fluorinated alcohol having the formula $CF_3(CF_2)_5CH_2CH_2OH$ (300 g, commercially available from E. I. du Pont de Nemours and Company, Wilmington, Del.), sodium borohydride (1.80 g), sodium iodide (0.83 g) to a reactor with stirring. The reactor was sealed and purged with nitrogen and vented three times. The reactor was then heated to between 60° C. and 80° C. until the pressure in the reactor reached 44.7 psi. The reactor was then cooled to between 60° C. and 70° C. and vented. The reactor was then heated to 130° C. and held for 30 minutes. Ethylene oxide (135 g) was slowly feed into the reactor. The reactor was then kept at 120° C. for 1 hour. Comparative Example C was vented and purged three times with nitrogen. The final product of Comparative Example C was the fluoroethoxylated alcohol, $CF_3(CF_2)_5CH_2CH_2$—O—$(CH_2CH_2O)_nCH_2CH_2OH$, where n is 2.7 to 3.7, which was used to prepare Example 1. Comparative Example C was then tested according to the Test Method 2 described above. Results are in Table 3.

Comparative Example D

Comparative Example D was prepared by adding fluorinated alcohol having the formula $CF_3(CF_2)_5CH_2CH_2OH$ (1768.8 g, commercially available from E. I. du Pont de Nemours and Company, Wilmington, Del.), borate ester (391.2 g), tetrabutylammonium iodide (7.89 g), sodium iodide (3.2 g) to a reactor with stirring. The reactor was sealed and purged with nitrogen and vented three times. The reactor was then heated to between 60° C. and 80° C. until the pressure in the reactor reached 44.7 psi. The reactor was then cooled to between 60° C. and 70° C. and vented. The reactor was then heated to 130° C. and held for 30 minutes. Ethylene oxide (2094 g) was slowly feed into the reactor. The reactor was then kept at 120° C. for 1 hour. The reactor was vented and purged three times with nitrogen. The final product of Comparative Example D was the fluoroethoxylated alcohol, $CF_3(CF_2)_5CH_2CH_2$—O—$(CH_2CH_2O)_nCH_2CH_2OH$, where n is 4.6 to 6.1, which was used to prepare Examples 2 and 3. Comparative Example D was then tested according to the Test Method 2 described above. Results are in Tables 3, 4 and 5.

Comparative Example E

Comparative Example E was prepared by adding fluorinated alcohol having the formula $CF_3(CF_2)_5CH_2CH_2OH$ (1650 g, commercially available from E. I. du Pont de Nemours and Company, Wilmington, Del.), sodium borohydride (9.88 g), sodium iodide (3.2 g) to a reactor with stirring. The reactor was sealed and purged with nitrogen and vented three times. The reactor was then heated to between 60° C. and 80° C. until the pressure in the reactor reached 44.7 psi. The reactor was then cooled to between 60° C. and 70° C. and vented. The reactor was then heated to 130° C. and held for 30 minutes. Ethylene oxide (1564 g) was slowly feed into the reactor. The reactor was then kept at 120° C. for 1 hour. Comparative Example E was vented and purged three times with nitrogen. The final product of Comparative Example E was the fluoroethoxylated alcohol, $CF_3(CF_2)_5CH_2CH_2$—O—$(CH_2CH_2O)_n CH_2CH_2OH$, where n is 9.0 to 11.0, which was used to prepare Examples 5 to 7. Comparative Example E was then tested according to the Test Method 2 described above. Results are in Tables 3, 4 and 5.

Surface tension measurements are listed in Table 2a and 2b. A lower surface tension indicates better surfactant properties.

TABLE 2a

Surface tension measurements in deionized water

| Sample | Surface Tension (dynes/cm) | | | | Temperature (° C.) |
|---|---|---|---|---|---|
| | 0.001% | 0.01% | 0.10% | 0.50% | |
| Blank | | 72.2 | | | 23.5 |
| 1 | 40.3 | 20.4 | 19.5 | 17.9 | 23.5 |
| 2 | 37.4 | 21 | 20.7 | 20.5 | 23.5 |
| 3 | 34.9 | 19.2 | 19.1 | 18.3 | 22.0 |
| 4 | 44.7 | 27 | 22.7 | 20.3 | 23.4 |
| 5 | 41 | 25.9 | 21.8 | 21.6 | 22.7 |
| 6 | 47.6 | 25.6 | 20.8 | 20.8 | 23.8 |
| 7 | 46.2 | 25 | 21.7 | 21.6 | 23.6 |
| Comparative A | 38.6 | 21.5 | 19.3 | 18.2 | 22.8 |
| Comparative B | 38.5 | 24.8 | 22.9 | 22.6 | 22.3 |

The data in Table 2a shows that for each Example 1 through 7, the surface tension was lowered compared to the blank (deionized water with no added surfactant). At a concentration of 0.01% or higher Examples 1 to 3, each containing a perfluoroalkyl of 6 carbons, and a lower level of ethoxylation, performed comparably or better than Comparative Example A, containing a perfluoroalkyl of 8 carbons and a lower level of ethoxylation. At a concentration of 0.01% Examples 4 to 7, each containing a perfluoroalkyl of 6 carbons, and a higher level of ethoxylation, performed comparably to Comparative Example B, containing a perfluoroalkyl of 8 carbons and a higher level of ethoxylation. At concentrations of 0.1 and 0.5%, Examples 4 to 7 demonstrated superior performance compared to Comparative Example B.

TABLE 2b

Surface Tension in 2% KCl

| Sample | Surface Tension (dynes/cm) | | | | Temperature (° C.) |
|---|---|---|---|---|---|
| | 0.001% | 0.01% | 0.10% | 0.50% | |
| Blank | | 74.2 | | | 22.1 |
| 3 | 34.9 | 19.2 | 19.1 | 18.3 | 22.0 |
| 5 | 41.0 | 25.9 | 21.8 | 21.6 | 22.7 |
| Comparative A | 26.0 | 22.9 | 19.9 | 19.5 | 22.1 |
| Comparative B | 37.6 | 24.6 | 22.5 | 22.2 | 22.0 |

The data in Table 2b shows that for each Example, the surface tension was lowered compared to the blank (2% KCl with no added surfactant). Example 3, containing a perfluoroalkyl of 6 carbons and a lower level of ethoxylation, at concentrations of 0.01%, 0.10% and 0.50% by weight, had slightly superior surface tension data when compared to Comparative Example A containing a perfluoroalkyl of 8 carbons and a lower level of ethoxylation. Example 5, containing a perfluoroalkyl of 6 carbons and a higher level of ethoxylation, at concentrations of 0.10% and 0.50% by weight, had slightly superior surface tension data when compared to Comparative Example B containing a perfluoroalkyl of 8 carbons and a higher level of ethoxylation.

Leveling and wetting test results are listed in Table 3. For leveling and wetting data, the higher ratings are preferred.

TABLE 3

Leveling and wetting

| Sample | Average Rating |
|---|---|
| 1 | 2.50 |
| 2 | 2.20 |
| 3 | 3.00 |
| 4 | 2.80 |
| 5 | 2.90 |
| 6 | 2.90 |
| 7 | 2.70 |
| Comparative A | 2.80 |
| Comparative C | 1.90 |
| Comparative D | 2.10 |
| Comparative E | 2.10 |
| Blank | 1.00 |

The data in Table 3 shows that Examples 1 though 7 performed better than the blank sample (same floor polish with no added surfactant). Examples 3 through 7, each containing a perfluoroalkyl of 6 carbons, performed comparably to or better than Comparative Example A containing a longer chain perfluoroalkyl of 8 carbons. Examples 1 to 7, each containing a perfluoroalkyl of 6 carbons, demonstrated superior performance to Examples C, D and E, non-urethane ethoxylated alcohol compounds each also containing a perfluoroalkyl of 6 carbons. This demonstrates the compounds of the invention of Formula 1 have superior performance to other compounds containing a perfluoroalkyl of the same chain length. Comparative Examples C, D, and E, non-urethane ethoxylated alcohol compounds each containing a perfluoroalkyl of 6 carbons, confirm that performance decreased in going from the 8 carbon perfluoroalkyl of Comparative Example A to the 6 carbon perfluoroalkyl in Comparative Examples C, D, and E.

Foaming tests are listed in Table 4 using tap water as the liquid for Examples 3 and 5, and Comparative Examples A and B. Small volumes and disintegration over 15 minutes are preferred.

TABLE 4

Foaming in tap water by blender test

| Sample | Volume (mL) | | | |
|---|---|---|---|---|
| | Initial | 5 min | 10 min | 15 min |
| 3 | 145 | 41 | 41 | 35 |
| Comparative A | 165 | 65 | 64 | 64 |
| Comparative D | 175 | 76 | 75 | 75 |
| 5 | 215 | 120 | 116 | 115 |
| Comparative B | 220 | 128 | 117 | 115 |
| Comparative E | 230 | 138 | 131 | 130 |

The data in Table 4 demonstrates that in tap water, Examples 3 and 5, containing a perfluoroalkyl of 6 carbons, performed comparably to or better than the Comparative Examples A and B, each containing a perfluoroalkyl of 8 carbons. Examples 3 and 5 showed superior performance compared to Comparative Examples D and E, non-urethane ethoxylated alcohol compounds each containing a perfluoroalkyl of 6 carbons.

Foaming tests are listed in Table 5 using 15% HCl as the liquid for Examples 3 and 5, and Comparative Examples A and B. This test illustrated use in aggressive solutions, such as those used in cleaning, electronic cleaning and etching applications. Small volumes and disintegration over 15 minutes are preferred.

TABLE 5

Foaming in 15% HCl by $N_2$ bubble test

| | Volume (mL) | | | |
|---|---|---|---|---|
| Sample | Initial | 5 min | 10 min | 15 min |
| 3 | 111 | 80 | 40 | 20 |
| Comparative A | 110 | 80 | 80 | 40 |
| Comparative D | 110 | 110 | 80 | 40 |
| 5 | 113 | 110 | 110 | 80 |
| Comparative B | 114 | 111 | 110 | 110 |
| Comparative E | 111 | 100 | 90 | 90 |

The data in Table 5 shows that compounds of the invention in 15% HCl demonstrated a low level of foaming and foam disintegration that is desirable for acidic applications. Examples 3 and 5, each containing a perfluoroalkyl of 6 carbons, performed better than Comparative Examples A and B, each containing a perfluoroalkyl of 8 carbons. Examples 3 and 5 showed superior performance compared to Comparative Examples D and E, non-urethane ethoxylated alcohol compounds each containing a perfluoroalkyl of 6 carbons.

What is claimed is:

1. A composition comprising a compound of Formula 1, where the compounds present fitting Formula 1 have no reaction in the composition;

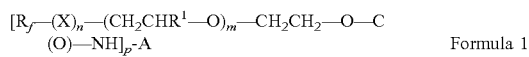

Formula 1 wherein $R_f$ is a $C_1$ to $C_6$ perfluoroalkyl;

X is —O—, —CH$_2$O—, —CH$_2$—, —CH$_2$CH$_2$O—, or —S(O)$_2$N(R$^2$)CH$_2$CH$_2$O— wherein $R^2$ is $C_1$ to $C_4$ alkyl;

n is 0 or 1;

R1 is H or $C_1$ to $C_4$ alkyl;

m is 1 to 20;

p is a positive integer of at least 2; and

A is the residue of a polyisocyanate selected from the group consisting of a hexamethylene diisocyanate, hexamethylene diisocyanate trimer, hexamethylene diisocyanate homopolymer; isophorone diisocyanate; hydrocarbon diisocyanate-derived isocyanurate trimers; isocyanurate trimer of toluene diisocyanate; isocyanurate trimer of 3-isocyanatomethyl-3,4,4-trimethylcyclohexyl isocyanate; methane-tris-(phenylisocyanate); bis-(4-isocyanatocyclohexyl) methane; 2,4-toluene diisocyanate; 2,6-toluene diisocyanate; diphenylmethane 4,4'-diisocyanate; diphenylmethane 2,4'-diisocyanate; 3-isocyanatomethyl-3,4,4-trimethylcyclohexyl isocyanate; bis-(4-isocyanatocyclohexyl)methane and diisocyanate trimers of formula (IIa), (IIb), (IIc), and (IId):

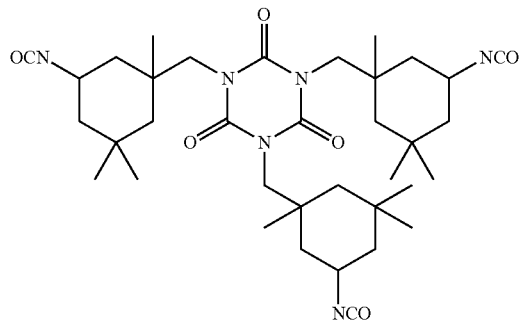

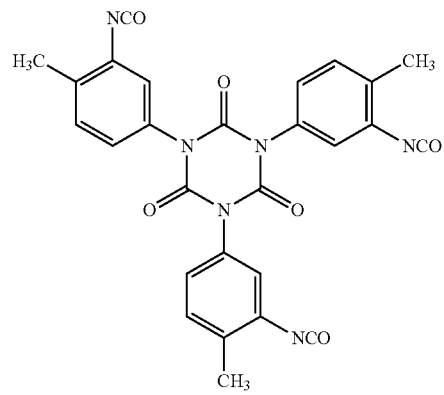

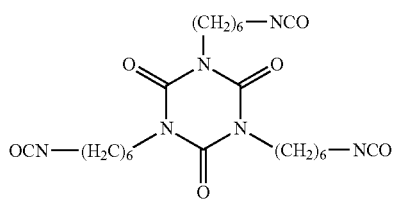

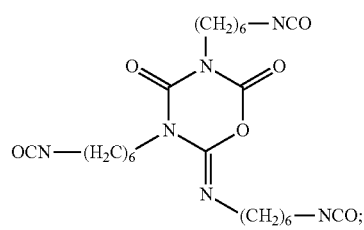

wherein the residue contains no active isocyanate groups;

wherein the compound is the reaction product of reagents consisting essentially of a fluorinated alcohol of Formula 2

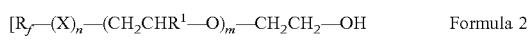

Formula 2 and a polyisocyanate, where $R_f$, X, n, $R^1$, and m are defined as above.

2. The compound of claim 1 wherein $R_f$ is a $C_4$ to $C_6$ perfluoroalkyl.

3. The compound of claim 2 wherein A is a residue of isophorone diisocyanate, hexamethylene diisocyanate, hexamethylene diisocyanate trimer, or a diisocyanate trimer of formula (IIa), (IIb), (IIc), and (IId):

(IIa)
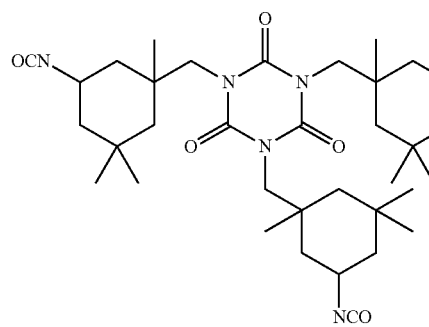
(IIb)
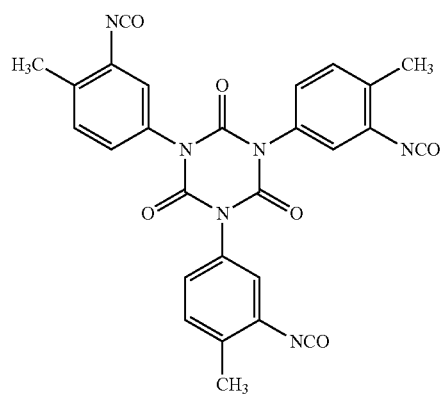
-continued
(IIc)
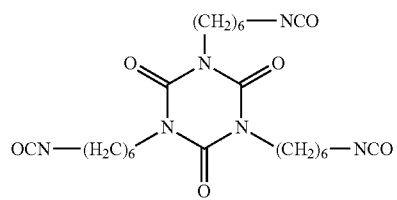
(IId)
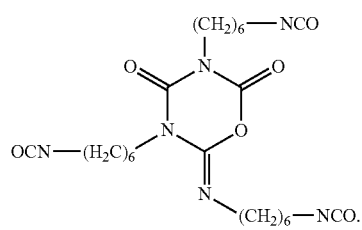
4. The compound of claim 2 wherein X is —CH$_2$CH$_2$O—.
* * * * *